Nov. 1, 1949 — F. S. THOMAS, JR — 2,487,002

POWER TRANSMISSION DEVICE

Filed Oct. 25, 1946

INVENTOR.
FRANK S. THOMAS JR.

BY *Jay Golrick & Jay*

ATTORNEYS

Patented Nov. 1, 1949

2,487,002

UNITED STATES PATENT OFFICE 2,487,002

POWER TRANSMISSION DEVICE

Frank Stevens Thomas, Jr., Murfreesboro, Tenn., assignor to Development Corporation, Inc., St. Louis, Mo., a corporation of Missouri Application October 25, 1946, Serial No. 705,509

3 Claims. (Cl. 74—217)

This invention relates to a power transmission device of the automatic ratio selector type. One of the prime objects of the transmission is the automatic selection of optimum driving-to-driven ratios, which vary in response to load conditions irrespective of speed.

Another object of the invention emphasizes means whereby the driving-to-driven ratios and torque selection may be infinitely varied within the limitations of the apparatus and may be obtained without regard to attention by the operator.

Still another object is the provision of a device of this character which is of light weight, simplicity, and which is marked by a basic design that lends itself to economy of fabrication and maintenance without the necessity of frequent adjustments. In its preferred form the design of the invention may be completely free of adjustable elements effecting the function of ratio or torque selection.

A further object is the provision of such a device wherein stresses and strains ordinarily imposed upon the teeth of driving gears, belts, shafts and other parts of similar structures, are obviated by reason of certain unique and inherently novel means employed for absorbing said stresses, as will later appear.

Related objects include a power transmission of general compactness which renders it inherently adapted to bicycle drives and other light machines. Although for purposes of this description the invention has been shown in connection with driving motorized bicycles, it is to be understood that this is an example without limitation, since it is not intended that the invention be limited to that of bicycle or other vehicular applications. On the contrary, the invention will find application in much broader fields of power application, especially those wherein automatically selective driving-to-driven ratios are a desideratum.

The foregoing objects, as well as other objects and advantages pointed out hereinafter, will be more clearly understood when the accompanying specification is read in conjunction with the attached drawings, in which Fig. 1 is a side elevational view of a bicycle schematically represented as embodying a preferred form of the invention;

Figure 1:
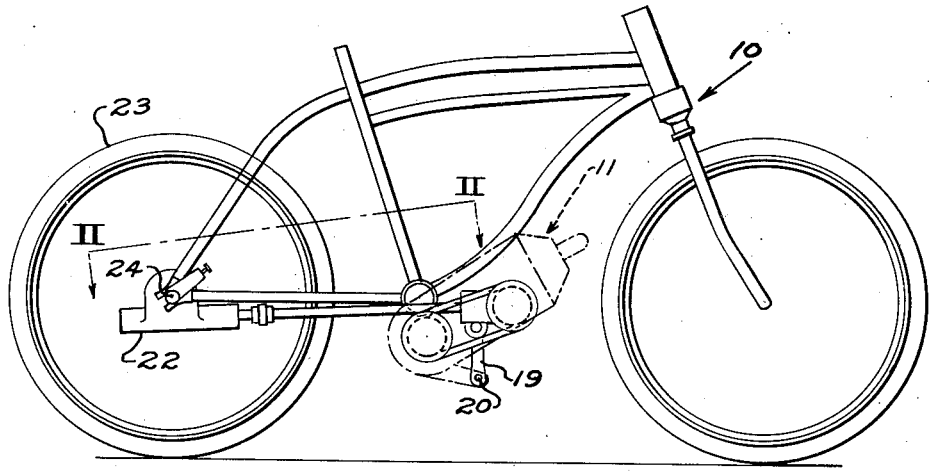

Referring more particularly to the drawings, a bicycle 10 is provided with a power unit 11 which is suspended from the frame of the bicycle in a manner that is the subject matter of my copending application Serial No. 705,510, filed October 25, 1946, entitled "Engine suspension," and which constitutes no part of the present invention as herein claimed. The main drive shaft of the engine 11 is extended through a clutch (not shown), as indicated at 12 in Fig. 2, positively to drive a V-belt pulley 13 having certain torque speed changing characteristics, which will be described hereinafter. A V-belt 14 is driven by the pulley 13 and in turn drives a V-belt pulley 15 which is connected to a shaft 16, driving bevel gears 17 within a gear box 18 that is movably connected, as shown in Fig. 1, by a pivoted link or arm 19 which is made fast to the stationary parts of the engine or associated structure by a pivot 20.

The arrangement of the bevel gears 17 within the gear box 18 is such as positively to drive the main drive shaft 21 which terminates at its other end in a worm and worm gear assembly 22, to which the torque load of the driven elements is applied. In the case at hand, this is illustrated as being the rear wheel 23 of a bicycle, the rear axle 24 of which is secured in driven relation to the worm gear 25.

Figure 4:
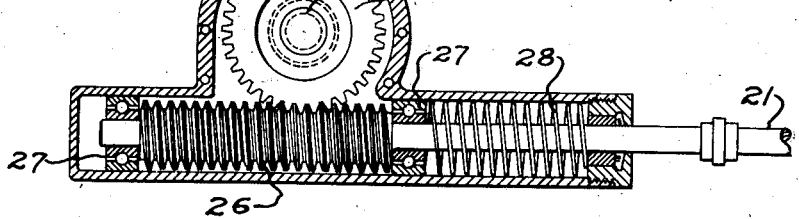
Fig. 4 is a longitudinal sectional elevational view taken along line III—III of Fig. 2.

By reference to Fig. 4 it will be noted that the drive shaft 21 terminates in an elongated worm 26 which coacts with the worm gear 25 to drive the latter. Suitable antifriction shaft bearings 27 are disposed within the casing of the assembly 22 to journal the shaft and worm therein. These bearings 27 are constructed and arranged so that their outer raceways may slide in directions axially of the shaft. A compression spring 28 is also provided within the casing which tends to keep the shaft 21, the worm 26 and its associated bearings 27 at the rear end of the casing, which corresponds to the left-hand end as viewed in Fig. 4. This arrangement is such that as the torque load on the power take-off shaft 24 increases, thus to retard the turning of the worm gear 25, the continued turning of the worm 26, through power applied to the shaft 21, will cause the latter to screw forward, i. e., move axially to the right, as viewed in Fig. 4, against the compression of the spring 28.

Figure 2:
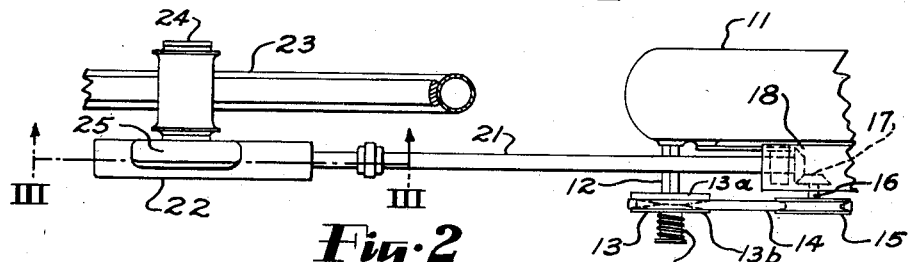
Fig. 2 is an enlarged fragmentary plan view of mechanism according to the present invention shown in Fig. 1 and as viewed along line II—II in that figure.

Returning now to the power sheave 13, this is what is commonly known as a split pulley in that it is comprised of complemental halves 13a and 13b, which are normally urged into contiguity by the compression load of a spring 29 (see Fig. 2). Movement of the shaft 21 in response to an increased load as just described is effective to cause the gear box 18 (through suitable thrust bearings not shown) and its associated sheave 15 also to move which, as viewed in Figs. 1 and 2, is to the right or forward end of the arrangement. This movement is of course made possible by virtue of the pivoted arm 19 previously described and is effective to increase the distance between the centers of the sheaves 13 and 15.

Figure 3:
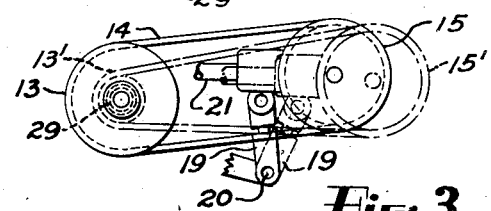
Fig. 3 is a side elevational view showing in detail an arrangement of parts appearing in Fig. 1, although considerably enlarged.

As viewed in Fig. 3, it will be seen that as the sheave 15 moves to a position corresponding to that shown at 15' in dotted lines, the V-belt 14 is caused to spread the halves 13a and 13b of the split pulley 13, thereby to be drawn to a position 13', shown in dotted lines in Fig. 3, which represent a smaller effective diameter of the power input sheave 13. It is obvious that this is effective to increase the ratio between the driving and driven elements in the proportion that the effective diameter of the sheave 13 becomes reduced in relation to the fixed diameter of the sheave 15 and this in turn augments the mechanical advantage of the engine and driving elements over the load bearing or driven elements so that an infinite change of ratio automatically occurs as the load varies and in direct response to such variations to afford optimum conversion of power.

As an example, let it be assumed that the split sheave 13 is 5 inches in diameter and that the fixed sheave 15 is also 5 inches and that the ratio between the worm 26 and the worm gear 25 is 10:1, then the over-all ratio (inasmuch as the sheaves under normal conditions are 1:1) between the engine shaft 12 and the load shaft 24 will be 10:1, with the belt running at the maximum effective diameter of the pulley 13. If, under conditions of increased load, the driven shaft 21 is shifted axially to increase the distance between centers of the sheaves 13 and 15, thus to cause the belt 14 to operate at a lesser effective diameter of the sheave 13, that is equal, say, to 2½ inches (or one-half of the original effective diameter), then the over-all ratio will be 20:1. This may be accepted as an example without limitation and any range of ratios are clearly within the purview of the invention. However, it should be noted that between the extremities of the range of ratios afforded, the variations possible are infinite and, effected on a smooth gradient, apply the correct power coupling for the load condition instantaneously and automatically without manual intervention. In addition, the springs 28 which absorb the thrust of the shaft 21, and the spring 29, against the load of which the sheave 13 is opened to increase the mechanical ratio, act as buffers to absorb rapid changes in the inertia of the parts as when starting from a dead stop or when otherwise the load on the driven elements is suddenly increased.

It will be understood that the split pulley drive here disclosed may find its counterpart in any other suitable torque-speed ratio-changing power coupling which may be actuated by the axial displacement of the drive shaft 21 in response to load conditions. It will also be evident that the pivotal mounting of the gear box 18 for accommodation of the axial thrust of the shaft 21 may be replaced by slide bearings which would effect the same result. Likewise, it will be seen that the compression spring 28, against which the thrust of the shaft is effected, may be placed anywhere along the shaft so as to be effective against collars or other forms of thrust bearing provided for this purpose, or it may be carried ahead of the gear box 18 normally to keep the centers of the sheaves 13 and 15 in the closest position. To the same effect, the arm 19 could be loaded as by a torsion spring acting about the axis of the pivot 20 to urge these shafts together. Any or all of these modifications are obviously within the purview of the present invention.

Other modifications, transposition of parts and substitution of elements may be made which, while departing from the letter of this specification, will still fall within the scope of the invention as is apprehended in and by the following claims.

I claim:

1. In a variable ratio torque-speed drive, a live pulley and a dead pulley, a V-belt coacting therebetween, one of said pulleys being of the split-type whereby its effective diameter may be varied, a load shaft, a worm-gear on said load shaft, a worm for propelling said worm-gear, a main shaft for driving said worm, said main shaft being connected in driven relation to one of said pulleys and having limited axial movement, and means effective to vary the distance between the centers of said pulleys responsive to axial movement of said main shaft.

2. A power transmission device comprising a driving member and driven members, said driven members including a drive shaft mounted for limited axial movement, means responsive to increase torque load on the driven members for moving said shaft axially, a variable ratio torque speed power coupling between said driving and driven members, said coupling including a live pulley and a dead pulley, one of said pulleys being of the split type whereby its effective diameter may be varied, a V-belt coacting between said pulleys, and means effective to vary the distance between the centers of said pulleys responsive to axial movement of said drive shaft.

3. In a power transmission device, a load shaft, a worm gear mounted on said load shaft, a worm for driving said worm gear, a shaft for driving said worm, said drive shaft being mounted for limited longitudinal axial movement, spring means biasing the drive shaft in one direction, a first pulley connected in driving relation to said drive shaft, a second pulley of the split type whereby its effective diameter may be varied, a V-belt coacting between said pulleys, and means effective to vary the distance between the centers of said pulleys responsive to longitudinal axial movement of said drive shaft.

FRANK STEVENS THOMAS, Jr.

REFERENCES CITED

The following references are of record in the file of this patent:

UNITED STATES PATENTS

| Number | Name | Date |
| --- | --- | --- |
| 1,873,404 | Hild | Aug. 25, 1932 |
| 2,155,351 | Paulus | Apr. 18, 1939 |
| 2,276,186 | Getchell | Mar. 10, 1942 |

FOREIGN PATENTS

| Number | Country | Date |
| --- | --- | --- |
| 509,765 | Germany | Oct. 11, 1930 |